(12) United States Patent
Kobayashi et al.

(10) Patent No.: US 7,948,567 B2
(45) Date of Patent: May 24, 2011

(54) OPTICALLY WRITABLE DISPLAY MEDIUM AND OPTICAL WRITING METHOD

(75) Inventors: Hideo Kobayashi, Kanagawa (JP); Yasuhiro Yamaguchi, Kanagawa (JP); Tomozumi Uesaka, Kanagawa (JP); Mieko Seki, Kanagawa (JP); Hiroe Okuyama, Kanagawa (JP); Masaaki Araki, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 156 days.

(21) Appl. No.: 12/251,212

(22) Filed: Oct. 14, 2008

(65) Prior Publication Data
US 2009/0195716 A1  Aug. 6, 2009

(30) Foreign Application Priority Data
Jan. 31, 2008  (JP) ................................. 2008-021626

(51) Int. Cl.
*G02F 1/135* (2006.01)
(52) U.S. Cl. ................................. 349/25; 349/2; 349/12
(58) Field of Classification Search ................ 349/25, 349/2, 12
See application file for complete search history.

(56) References Cited

U.S. PATENT DOCUMENTS

| 5,552,253 | A | * | 9/1996 | Kovacs et al. | 430/57.3 |
|---|---|---|---|---|---|
| 6,406,823 | B2 | * | 6/2002 | Melnyk et al. | 430/46.2 |
| 7,570,310 | B2 | * | 8/2009 | Harada et al. | 349/25 |
| 7,619,600 | B2 | * | 11/2009 | Harada et al. | 345/87 |
| 2004/0263700 | A1 | * | 12/2004 | Hikichi et al. | 349/30 |

FOREIGN PATENT DOCUMENTS

| JP | A-5-100445 | 4/1993 |
|---|---|---|
| JP | A-5-197252 | 8/1993 |
| JP | A-2000-180888 | 6/2000 |
| JP | A-2001-100664 | 4/2001 |
| JP | A-2005-17726 | 1/2005 |

OTHER PUBLICATIONS

Fukushima, "Liquid Crystal Spatial Optical Modulator and Optical Information Processing," *Ekishou*, vol. 2, No. 1, Jan. 25, 1998, pp. 3-9 (with abstract).

* cited by examiner

*Primary Examiner* — Brian M. Healy
*Assistant Examiner* — Eric Wong
(74) *Attorney, Agent, or Firm* — Oliff & Berridge, PLC

(57) ABSTRACT

An optically writable display medium includes an optical switching element and a display element. The optical switching element includes a charge transport layer sandwiched between an upper charge generating layer and a lower charge generating layer. The display element includes a display layer having memory properties and is provided on the optical switching element. The absorption wavelength region of the upper charge generating layer and the absorption wavelength region of the lower charge generating layer are substantially different from each other.

11 Claims, 14 Drawing Sheets

US 7,948,567 B2

OPTICALLY WRITABLE DISPLAY MEDIUM AND OPTICAL WRITING METHOD

CROSS-REFERENCE TO RELATED APPLICATION

This application is based on and claims priority under 35 USC 119 from Japanese patent Application No. 2008-021626 filed on Jan. 31, 2008.

BACKGROUND

1. Technical Field

The present invention relates to an optically writable display medium and an optical writing method.

2. Related Art

In recent years, optically writable space modulation devices in which an optical switching element and a display element are combined have been developed and practically used as light bulbs in projectors for example.

The optically writable spatial modulation devices change the impedance of the optical switching element according to the amount of received light while applying a given voltage to an element, and controls the voltage applied to the display element to thereby drive the display element for displaying an image. In particular, detachable optically writable display media that use elements having memory properties as display controlling elements of the optically writable space modulation devices have attracted attention as electronic paper media.

As the display elements for the optically writable display media, for example, liquid crystal display elements, such as nematic liquid crystals, cholesteric liquid crystals, and ferroelectric liquid crystals that have been imparted with memory properties by being dispersed in polymers; electrophoretic elements; elements that utilizes rotation by electric field; elements that utilizes movement of toner by electric field; and elements obtained by encapsulating these elements have been studied.

SUMMARY

According to an aspect of the invention, there is provided an optically writable display medium including: an optical switching element that includes a charge transport layer sandwiched between an upper charge generating layer and a lower charge generating layer; and a display element that includes a display layer having memory properties and that is provided on the optical switching element. The absorption wavelength region of the upper charge generating layer and the absorption wavelength region of the lower charge generating layer are substantially different from each other.

BRIEF DESCRIPTION OF THE DRAWINGS

Exemplary embodiments of the present invention will be described in detail based on the following figures, wherein.

DETAILED DESCRIPTION

Exemplary embodiments of the present invention are described below.

In the optically writable display medium of this exemplary embodiment (hereinafter sometimes simply referred to as a "display medium"), an optical switching element including a charge transport layer sandwiched between an upper charge generating layer and a lower charge generating layer, and a display element including a display layer having memory properties are disposed in this order, and the absorption wavelength region of the upper charge generating layer and the absorption wavelength region of the lower charge generating layer are substantially different from each other. Here, the condition that the absorption wavelength region of the upper charge generating layer and the absorption wavelength region of the lower charge generating layer are substantially different from each other means that there are at least (i) a wavelength region in which only the upper charge generating layer absorbs light and (ii) a wavelength region in which only the lower charge generating layer absorbs light. It should be noted that, in the present invention, a region within which the absorptance is 75% or more of the maximum absorptance is defined as a light absorption wavelength region.

In the following, the optically writable display medium of this exemplary embodiment is described with reference to the drawings.

Figure 1:
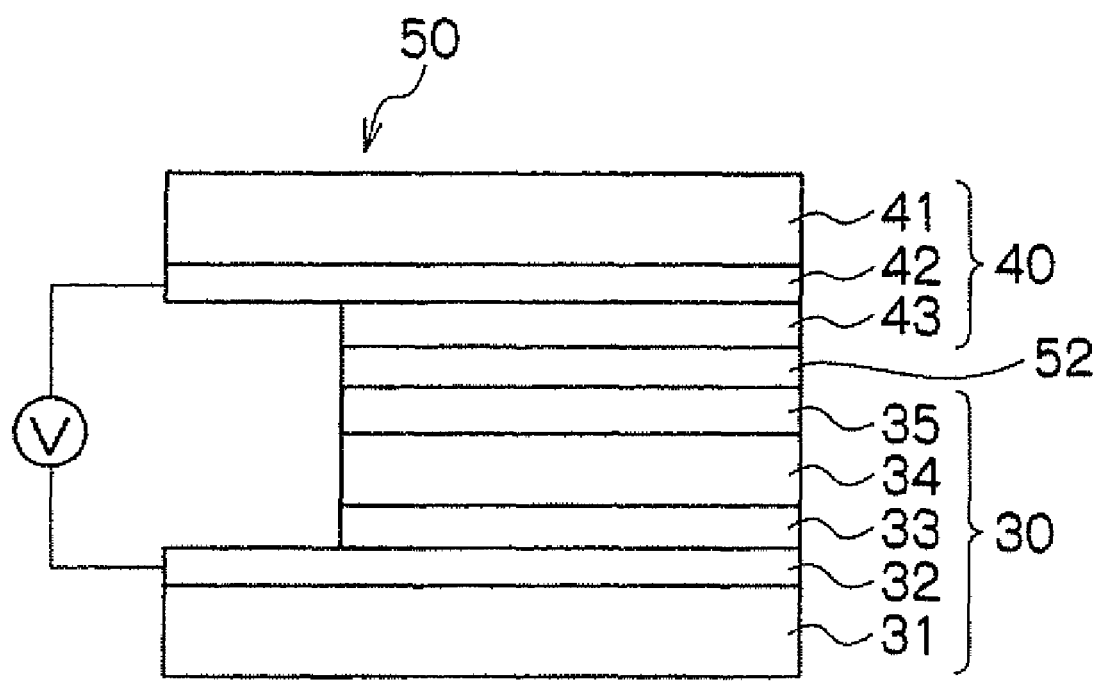
FIG. 1 is a schematic diagram illustrating an example of a cross section of an optically writable display medium of an exemplary embodiment.

FIG. 1 is a cross section illustrating an optically writable display medium of this exemplary embodiment. An optically writable recording medium (optically writable display medium) 50 includes an optical switching element 30, a display element 40, and functional film 52 sandwiched between the optical switching element and the display element. As illustrated in FIG. 1, the optical switching element 30 includes a substrate 31, an electrode 32, a lower charge generating layer 33, a charge transport layer 34, and an upper charge generating layer 35. The display element 40 includes a substrate 41, an electrode 42, and a display layer 43. In the optically writable display medium 50, the upper charge generating layer 35 is located at the display element side. An AC electric field is applied to between the electrodes 32 and 42. In the optically writable display medium 50, the substrate and electrode of the element at a light incident side should transmit light according to whether optical writing is performed from the optical switching element side or the display element side.

(Optical Switching Element)

Figure 2:
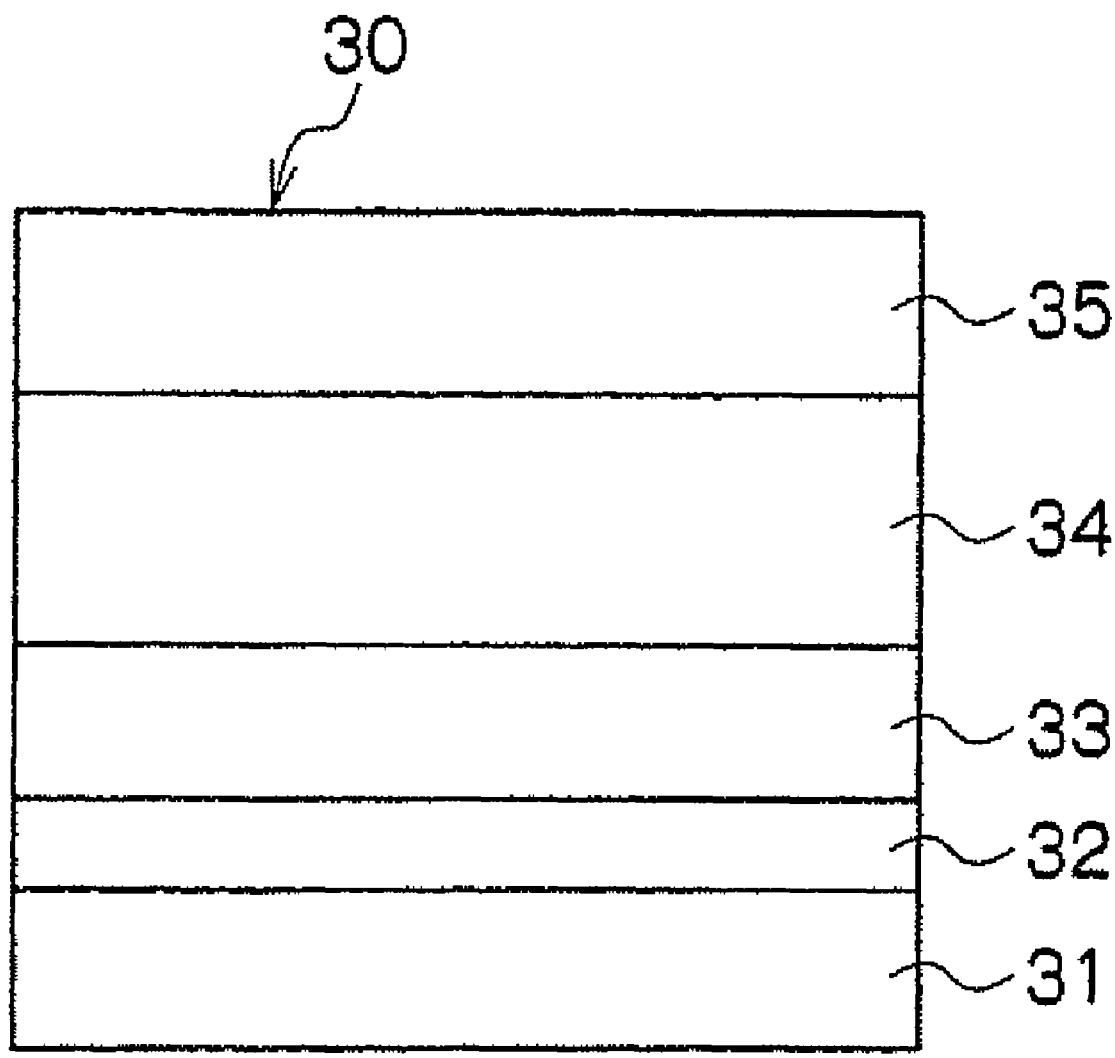
FIG. 2 is a schematic diagram illustrating an example of a cross section of an optical switching element in the exemplary embodiment.

First, the optical switching element in this exemplary embodiment is described below with reference to FIG. 2. In the optical switching element 30 (optical switching element having a dual CGL structure) illustrated in FIG. 2, on the substrate 31 on which the electrode 32 (electroconductive film) has been formed, the lower charge generating layer 33 (first charge generating layer), the charge transport layer 34, and the upper charge generating layer 35 (second charge generating layer) are successively disposed as an optical switching layer (photoconductive layer), so that the charge transport layer is sandwiched by the pair of charge generating layers. In the optically writable display medium described below, the upper charge generating layer 35 is located, for example, at the display layer side. In FIG. 2, the arrow represents the direction of light incidence (however, the direction of light incidence is not necessarily limited thereto).

The substrate 31 includes a polymer film having flexibility and insulation properties, such as films of polyethylene terephthalate, polysulfone, polyether sulphone, polycarbonate, and polyethylenenaphthalate. When an organic material is used for the photoconductive layer, there is no high-temperature heat-treatment step. Therefore, a light-transmitting plastic plate may be used from the viewpoint of, for example, successfully obtaining a flexible substrate, ease of forming, and cost.

The thickness of the substrate 31 may be in the range of from 0.01 mm to 0.5 mm.

The electrode 32 includes ITO (Indium Tin Oxide); however, it is also possible to use, instead of ITO, light-transmitting electroconductive materials. Examples thereof include metal thin films, such as Au; oxides, such as $SnO_2$ and ZnO, and thin films of electroconductive polymers, such as polypyrrole. Although the electrode 32 in this exemplary embodiment is formed on the substrate 31 by sputtering, the electrode 32 may be formed by methods other than sputtering, such as printing, CVD, and deposition.

It should be noted that the substrate 31 and the electrode 32 are not always required to be light-transmitting. More specifically, as disclosed in Japanese Patent Application Laid-Open (JP-A) No. 2001-100664, when a display element of an optically writable display medium has memory properties and has selective reflection properties that enables selective reflection of light of a required wavelength for display or backscattering properties, writing can be performed from the display side. In such a case, only the substrate 41 and electrode 42 at the display element side are required to be light-transmitting. Therefore, when optical writing is performed from the display element side, the substrate 31 or electrode 32 of the optical switching element 30 does not need to be light-transmitting, and the electrode 32 may be an Al layer, for example.

In the optically writable display medium of this exemplary embodiment, the absorption wavelength region of the upper charge generating layer 35 and the absorption wavelength region of the lower charge generating layer 33 are substantially different from each other. More specifically, the absorption wavelength region of the charge generating material contained in the upper charge generating layer is substantially different from the absorption wavelength region of the charge generating material contained in the lower charge generating layer.

In the optically writable display medium of this exemplary embodiment, it is preferable that the charge generating material contained in the upper charge generating layer 35 be an n-type charge generating material. Moreover, in this case, it is more preferable that the charge generating material contained in the lower charge generating layer 33 be a p-type charge generating material. When the charge generating material contained in the upper charge generating layer 35 is an n-type charge generating material, a negative charge has higher mobility, which suppresses the accumulation of negative charge between the optical switching element 30 and the display element 40. As a result, image deterioration due to repetition may be suppressed. Due to this effect, even when optical writing is performed with a single wavelength, the effect of suppressing the image deterioration due to repetition may be obtained. For example, when writing is performed only with light having a wavelength which is absorbed by the lower charge generating layer, a small amount of negative charge generated within the upper charge generating layer is removed immediately, so that charge accumulation may not occur and image deterioration may be suppressed resultantly.

Examples of the n-type charge generating material contained in the upper charge generating layer 35 include quinacridone, dibromoanthanthrone, perylene, fullerene, and fully fluorinated phthalocyanine; and quinacridone, dibromoanthanthrone, and perylene are preferable.

There is no limitation on the charge generating material contained in the lower charge generating layer 33 insofar as the material has an absorption wavelength that is substantially different from the absorption wavelength of the charge generating material contained in the upper charge generating layer 35. Examples of usable charge generating materials include metal-free phthalocyanine, a squalirium compound, an azulenium compound, a perylene pigment, an indigo pigment, a bis- or tris-azo pigment, a quinacridone pigment, a pyrrolopyrrole colorant, a polycyclic quinone pigment, a condensed ring aromatic pigment such as dibromoanthrone, a cyanine pigment, a xanthene pigment, a charge transfer complex such as a charge transfer complex of polyvinylcarbazole and nitrofluorene, an eutectic complex of a pyrylium salt dye, and a polycarbonate resin. A charge generating material is preferable which contains, as a main component, one member or a mixture of two or more members of chlorogallium phthalocyanine, hydroxygallium phthalocyanine, and titanylphthalocyanine, which are phthalocyanine charge generating materials.

Figure 4:
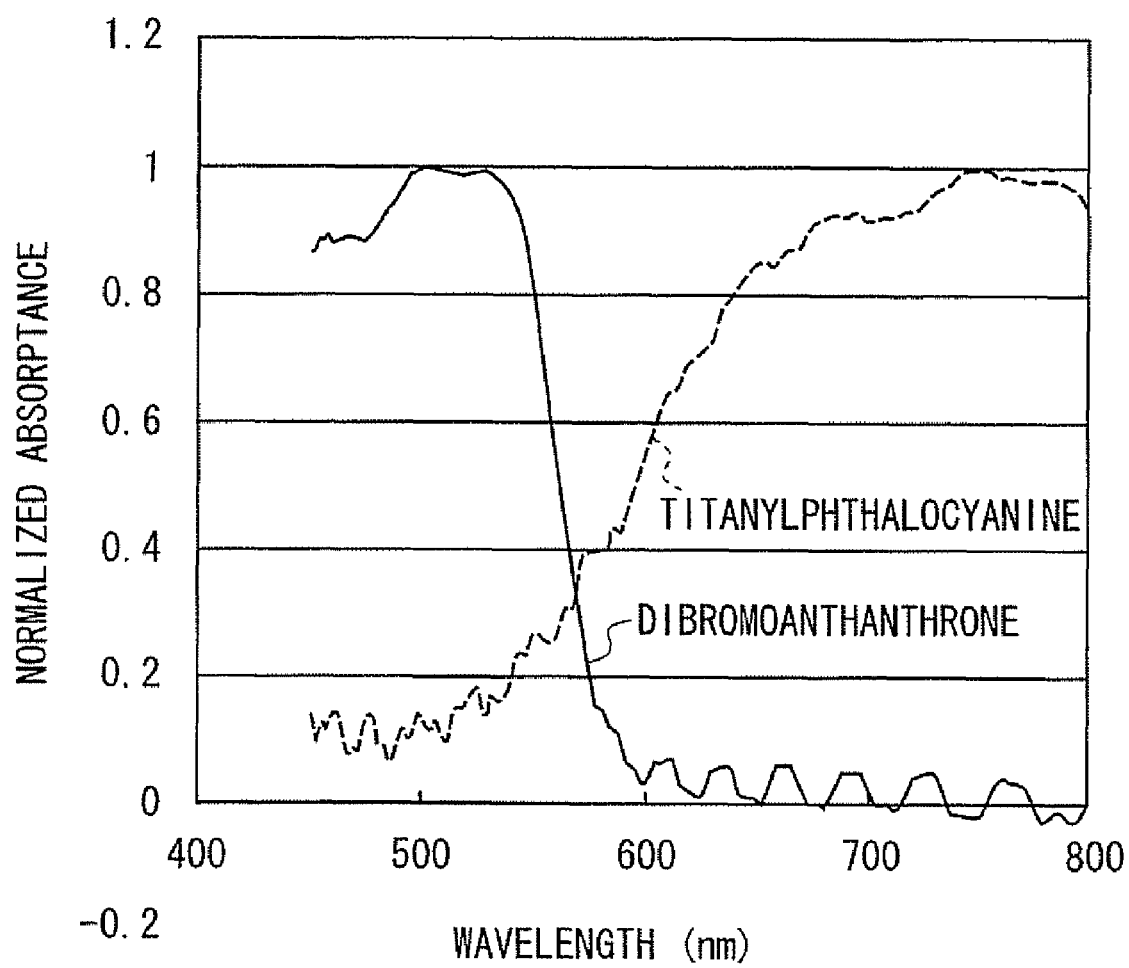
FIG. 4 is a graph illustrating an example of the relationship between a wavelength and an absorptance.
Figure 5:
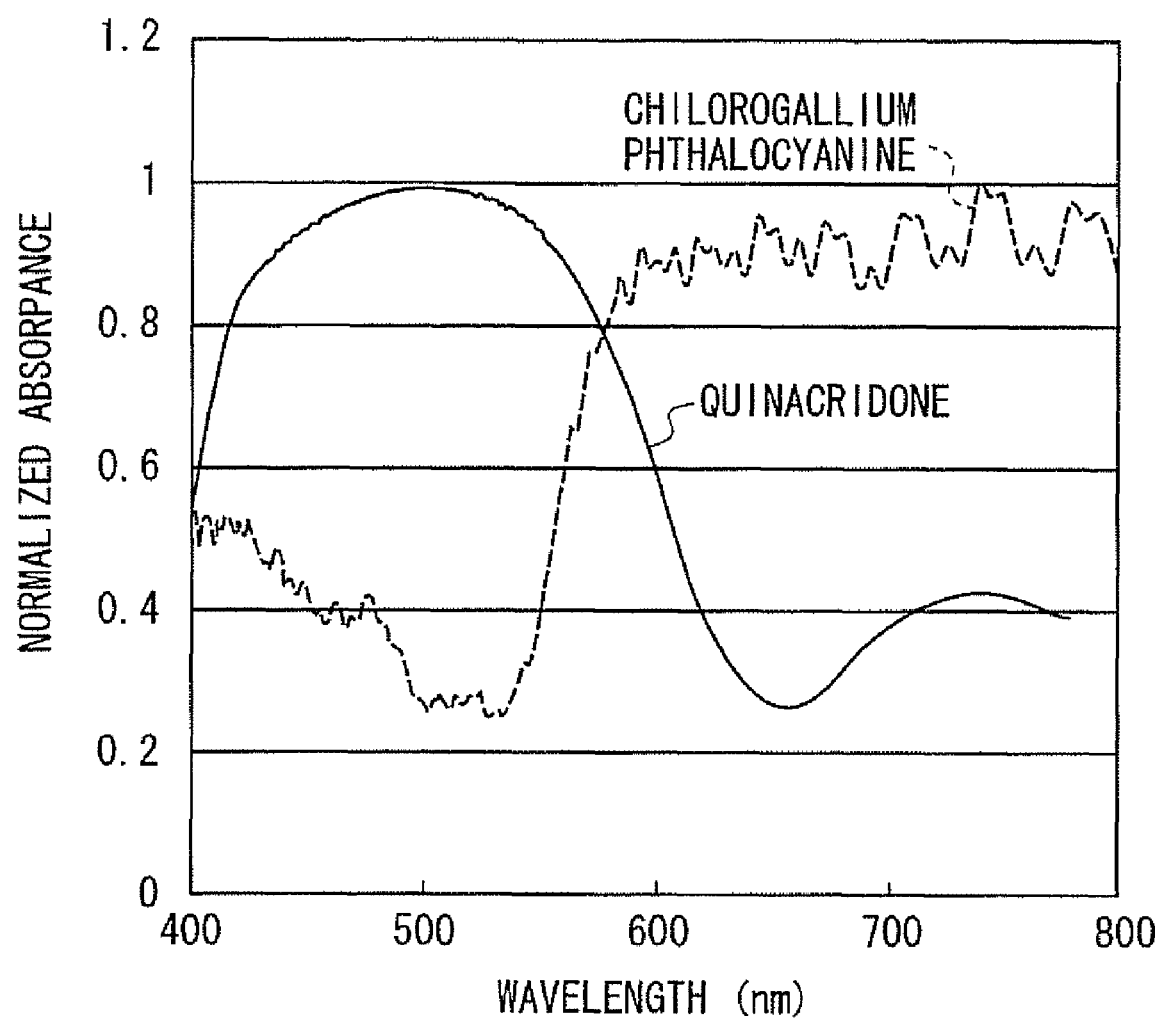
FIG. 5 is a graph illustrating another example of the relationship between the wavelength and the absorptance.
Figure 6:
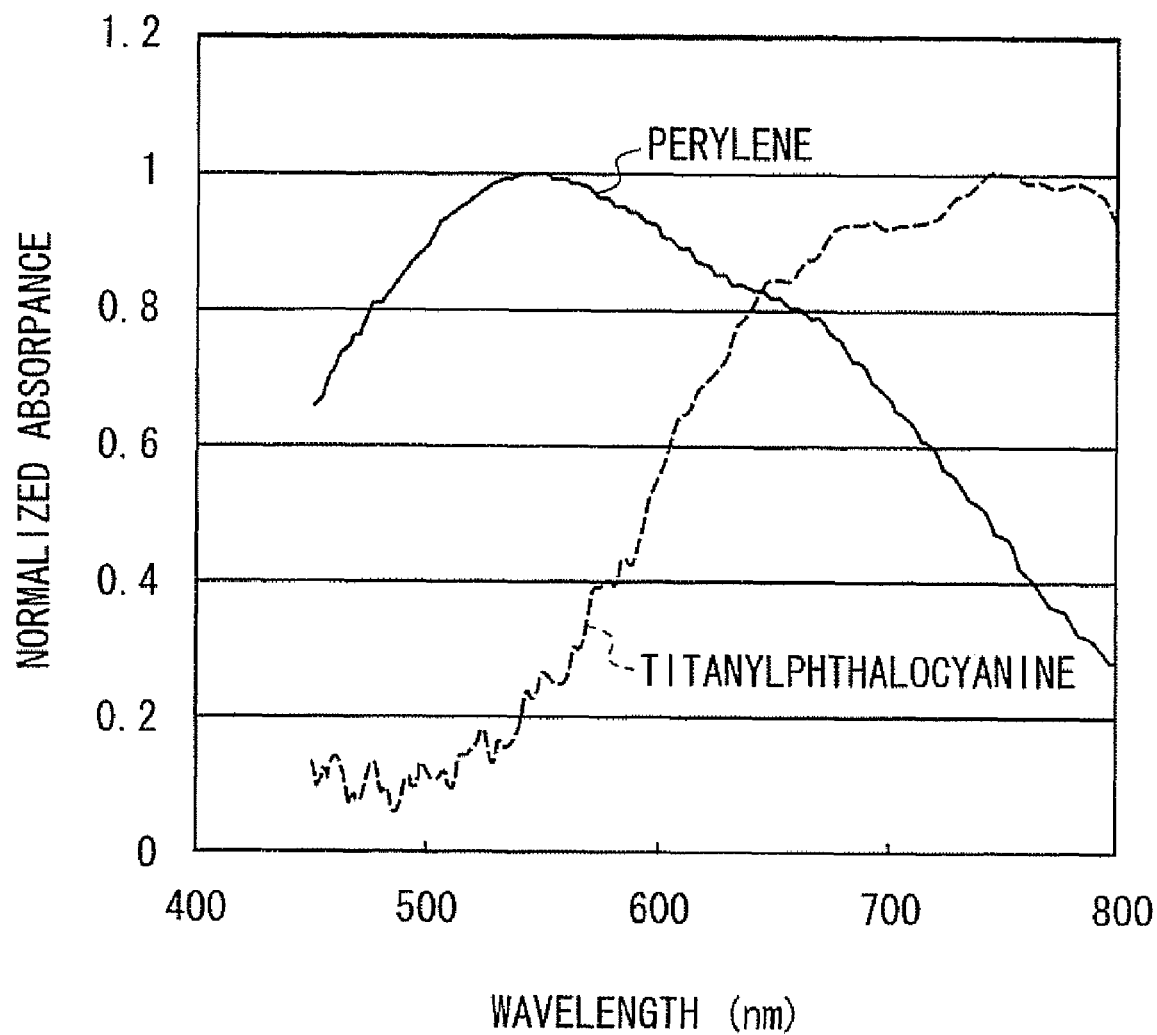
FIG. 6 is a graph illustrating still another example of the relationship between the wavelength and the absorptance.

Examples of a preferable combination (upper charge generating layer 35-lower charge generating layer 33) of the charge generating material contained in the upper charge generating layer 35 and the charge generating material contained in the lower charge generating layer 33 include combinations of dibromoanthanthrone-titanylphthalocyanine, dibromoanthanthrone-chlorogalliumphthalocyanine, quinacridone-chlorogalliumphthalocyanine, and perylene-titanylphthalocyanine. With respect to the combinations of dibromoanthanthrone-titanylphthalocyanine, quinacridone-chlorogalliumphthalocyanine, and perylene-titanylphthalocyanine, the relationship between the wavelength and the absorptance is shown in FIGS. 4 to 6, respectively.

Moreover, the upper charge generating layer 33 may contain a charge transport material as required in addition to the charge generating material. Similarly, the lower charge generating layer 35 may contain a charge transport material as required in addition to the charge generating material. As the charge transport materials, charge transport materials usable in the charge transport layer 34 described below may be used.

In this case, the mixing ratio (the charge transport material/the charge generating material) of the charge transport material to be contained is preferably in the range of from 0.1 to 50 weight %, and more preferably in the range of from 0.1 to 25 weight %.

The upper charge generating layer 35 preferably generate an amount of carriers that is comparable with that generated by the lower charge generating layer 33. Therefore, the upper charge generating layer 35 may have sensitivities to the wavelength, the amount of light, and the voltage that are comparable with the sensitivities of the lower charge generating layer 33. From this viewpoint, the same charge generating material may be used in the upper and lower charge generating layers. However, it is also possible to use different materials having comparable sensitivities in the respective layers.

Examples of binder resins used in the upper charge generating layer 33 and the lower charge generating layer 35 include a polyarylate resin, a polyester resin, a phenoxy resin, a vinyl chloride-vinyl acetate resin, a carboxyl-modified vinyl chloride-vinyl acetate copolymer, a polyamide resin (such as a nylon resin), an acrylic resin, a polyacrylamide resin, a polyvinyl pyridine resin, a cellulose resin, a urethane resin, an epoxy resin, casein, a polyvinyl alcohol resin, and a polyvinyl pyrrolidone resin. In particular, a polyamide resin, especially a nylon resin such as methoxymethylated 6-nylon, is effective since it is soluble in most alcohols and keto alcohols. Moreover, the carboxyl-modified vinyl chloride-vinyl acetate copolymer is a preferred binder resin since it is soluble in keto alcohol and allows favorable dispersion of hydroxygallium phthalocyanine or the like as the charge generating material.

The mixing weight ratio (the charge generating material/ the binder resin) of the charge generating material (including a charge transport material, when added) to the binder resin in each of the upper charge generating layer 33 and the lower charge generating layer 35 is preferably in the range of from 9/1 to 4/6, and more preferably in the range of from 8/2 to 5/5.

When the proportion of the charge generating material in the mixing weight ratio is lower than 4/6, the surface of the charge generating layer becomes smooth due to the abundant binder resin; as a result, an anchor effect (anchoring effect), by which adhesiveness is improved, may not be obtained in some cases. When the proportion of the charge generating material exceeds 9/1, the excessive amount of the charge generating material may prevent achievement of sufficient film strength in some cases.

As to a method of forming the upper charge generating layer 33 and the lower charge generating layer 35, since a charge generating layer is formed by applying a coating solution for forming the layer in this exemplary embodiment, a spin coating method, a dip coating method, a blade coating method, a roll coating method, a spray coating method, a bar coating method, a gravure coating method, etc., are applicable. In every method, heating of a substrate and strict process control, which are conducted in the production of a-Si or a photodiode, are not necessary. For the coating, the solvent may be one of, or a mixture of two or more of, the following common solvents: water, methanol, ethanol, n-propanol, n-butanol, benzyl alcohol, methyl cellosolve, ethyl cellosolve, acetone, methyl ethyl ketone, cyclohexanone, methyl acetate, n-butyl acetate, dioxane, tetrahydrofuran, methylene chloride, chloroform, chlorobenzene, and toluene.

Particularly in this exemplary embodiment, the upper charge generating layer 35 may be formed using a coating solution for the upper charge generating layer containing a solvent that does not damage the charge transport layer 34. Specifically, it is preferable to use an alcohol solvent as the solvent, and it is more preferable for the solvent to contain n-butanol. In this case, the solvent may be n-butanol alone, or may be a mixture of n-butanol and one or more kinds of the aforementioned solvents that are added in a range within which the charge transport layer 34 is not damaged. The ratio (volume ratio) of n-butanol to the total of the one or more other solvents is suitably in the range of from 60/40 to 95/5.

Here, the damage to the charge transport layer 34 refers to swelling of the charge transport layer, dissolution of the charge transport material or the binder resin, crystallization of the charge transport material, deterioration in a film such as development of cracking, and deterioration in electric characteristics occurring in the charge transport layer 16 due to the solvent in the coating solution for forming the upper charge generating layer to be applied to the charge transport layer. Therefore, by forming the upper charge generating layer 35 in this way, it may be possible to obtain an optically writable display medium having an optical switching element which is homogeneous and has high sensitivity and which has a dual CGL structure that provides a high production yield.

The preparation of the coating solution for forming the upper charge generating layer and the coating solution for forming the lower charge generating layer may include adding the charge generating material and, optionally, the charge transport material to the solvent (or a solution in which the binder resin has been dissolved) in the above-mentioned preferable mixing ratio, and mixing and dispersing the material (s). The mixing/dispersing method may be a common method, such as a method using a ball mill, a roll mill, a sand mill, an attritor, a bead mill, or an ultrasonic wave. In dispersing, it is effective to adjust the particle size of the charge generating material to 0.5 μm or less, preferably 0.3 μm or less, and more preferably 0.15 μm or less.

The concentration of the solid content of the coating solution for forming the upper charge generating layer is preferably in the range of from 1 to 30 weight %, and the concentration of the solid content of the coating solution for forming the lower charge generating layer is also preferably in the range of from 1 to 30 weight %. When the concentration is less than 1 weight %, satisfactory electric characteristics are not be obtained in some cases due to excessively small thickness of the layer. When the concentration exceeds 30 weight %, film formation is difficult in some cases due to excessively high viscosity. Moreover, when the concentration is less than 1 weight % or exceeds 30 weight %, in some cases, the dispersion stability of particles of the charge generating material is poor and the storage stability and film forming properties are deteriorated.

It is preferable to conduct drying by heating, after the formation of the charge generating layer by application of the coating solution for forming a charge generating layer. The drying temperature is preferably in the range of from 90 to 150° C., and more preferably in the range of form 100 to 140° C.

When the drying temperature is less than 90° C., the adhesiveness between the substrate 31 and the charge generating layer and/or the adhesiveness between the charge transport layer 34 and the charge generating layer may be insufficient. When the drying temperature exceeds 150° C., the resin component, the charge transport material, and the like may be deteriorated and/or the substrate may thermally contract accompanied by cracking of the electrode. It should be noted that the above-mentioned drying by heating may be performed both of after the formation of the lower charge generating layer 33 and after the formation of the upper charge generating layer 35, or may be performed only after the formation of the upper charge generating layer 35. Moreover, when it is ensured that satisfactory electric characteristics and surface properties are still obtained, the drying by heating may be performed after the production of a functional film or after the production of the optically writable recording medium.

The thickness of each of the upper charge generating layer 33 and the lower charge generating layer 35 is preferably in the range of from 10 nm to 1 μm, and more preferably in the range of from 20 nm to 500 nm. When the film thickness is less than 10 nm, the light sensitivity may be insufficient and it may be difficult to produce a uniform film. In contrast, when the thickness is more than 1 μm, the light sensitivity may be saturated and separation may easily occur due to an internal stress of the layer.

The thickness of each of the charge generating layers may be adjusted such that the amount of light absorbed in the upper charge generating layer 35 is equal to the amount of light absorbed in the lower charge generating layer 33, based on the results of the measurements for determining the absorptance of the charge transport layer and the changes in the absorptance for writing light in relation to varying thicknesses of the charge generating layer (refer to JP-A No. 2005-017726). It is more preferable that the final formulation adjustment including adjustment of the addition amount of the charge transport material and the thickness of each charge generating layer be performed by actually producing an element, and evaluating the waveform symmetry at the time of driving the element with an alternating current.

Specific examples of the charge transport material contained in the charge transport layer 34 include, as a hole transport material, a trinitro fluorene compound; a polyvinyl carbazole compound; an oxadiazole compound; a hydrazone compound, such as benzylamino hydrazone or quinoline hydrazone; a stilbene compound; a triphenylamine compound; a triphenylmethane compound; and a benzidine compound. In contrast, examples of an electron transport material include a quinone compound, a tetracyano quinodimethane compound, a fluorenone compound, a xanthone compound, and a benzophenone compound.

As the charge transport material, substances containing a benzidine compound and/or a triphenylamine compound as a main component are preferable. Examples of useful charge transport materials include a hydrazone compound, a styryl triphenylamine compound, an N,N,N',N'-tetraphenyl benzidine compound, and a triphenylamine compound.

Among the charge transport materials, the triphenylamine compound and the benzidine compound, especially the benzidine compound, are effective from the viewpoint of sensitivity and reduction in the resistance; the ionization potential (Ip) such a compound is close to that of the charge generating material (CGM) compared with other materials, and, moreover, since such a compound has a low ionization potential (Ip) and high compatibility with a binder polymer (binder resin), concentration segregation is less likely to occur.

Examples of such compounds include at least one benzidine compound selected from the group consisting of N,N'-bis(3-methylphenyl)-N,N'-diphenyl-(1,1'-biphenyl)-4,4'-diamine, N,N'-bis(3-ethylphenyl)-N,N'-diphenyl-(1,1'-biphenyl)-4,4'-diamine, N,N'-bis(3-ethylphenyl)-N,N'-diphenyl-(1,1'-biphenyl)-4,4'-diamine, and N,N'-bis(3-ethylphenyl)-N,N'-bis(3-methylphenyl)-(1,1'-biphenyl)-4,4'-diamine, and N,N-bis(3,4-dimethylphenyl)bisphenyl-4-amine, which is a triphenylamine compound.

Examples of the binder resin contained in the charge transport layer 34 include a polycarbonate resin, a polyester resin, a methacrylic resin, an acrylic resin, a polyvinyl chloride resin, a polyvinylidene chloride resin, a polystyrene resin, a polyvinyl acetate resin, a styrene-butadiene copolymer, a vinylidene chloride-acrylonitrile copolymer, a vinyl choride-vinyl acetate copolymer, a vinyl chloride-vinyl acetate-maleic anhydride copolymer, a silicone resin, a silicone-alkyd resin, a phenol-formaldehyde resin, a styrene-alkyd resin, poly-N-vinylcarbazole, and polysilane.

In particular, it is preferable to use the polycarbonate resin as a binder resin because the properties of the charge transport material may be improved.

The mixing ratio (the charge transport material/the binder resin) of the charge transport material to the binder resin in the charge transport layer 34 is preferably in the range of from 1/10 to 10/1, and more preferably in the range of from 3/7 to 7/3.

Examples of methods of producing the charge transport layer include, besides dry film formation methods such as a vacuum deposition method and a sputtering method, methods using a solvent such as a spin coating method, a dip coating method, a blade coating method, a roll coating method, a die coating method, a curtain coating method, and a slide hopper coating method. In the case of a coating method using a solvent, it is possible to use one of, or a mixture of two or more of, common organic solvents including: aromatic hydrocarbons, such as benzene, toluene, xylene, and chlorobenzene; ketones, such as acetone and 2-butanone; halogenated aliphatic hydrocarbon compounds, such as methylene chloride, chloroform, and ethylene chloride; and cyclic or straight chain ethers, such as tetrahydrofuran and ethyl ether.

The thickness of the charge transport layer is preferably in the range of from 0.1 to 100 μm, and more preferably in the range of from 1 to 10 μm. When the thickness is less than 0.1 μm, decrease in voltage resistance may lead to difficulty in securing the reliability. In contrast, when the thickness is greater than 100 μm, difficulty in impedance matching with a functional element may make difficult the designing.

In the optical switching element of this exemplary embodiment the photoconductive properties of the charge generating layers disposed respectively at the upper and lower sides of the charge transport layer can be made almost the same as described above. Further, as disclosed in JP-A No. 2000-180888, a functional layer having a capacitor component capable of removing a direct current component—a functional film for removing a direct current component—may be provided, as required, in the optical switching element. Minute effective DC bias may be removed thereby.

Moreover, it is also possible to provide one or more other functional layers than the above-mentioned functional film for removing a direct current component. For example, a layer for preventing the injection of a dark carrier and/or a layer for increasing adhesiveness may be provided between an electrode layer and a charge generating layer. Moreover, it is possible to provide a reflection film and/or a light shielding film, and it is also possible to provide a functional layer having two or more of the functions described above. Such a functional layer is applicable in the range within which the flow of electric current is not significantly hindered.

<Display Element>

The display element in this exemplary embodiment is a display element including a display layer having memory properties. As such a display element, a liquid crystal display element having memory properties can be mentioned, for example. The liquid crystal display element having memory properties refers to a liquid crystal having such properties that, after the liquid crystal is oriented under control by application of voltage and the application of the voltage is stopped, the orientation of the liquid crystal is maintained for a certain period of time. Specific examples thereof include a polymer dispersed liquid crystal (PDLC), a ferroelectric liquid crystal such as a chiral smectic C phase, and a cholesteric liquid crystal. Moreover, a liquid crystal element obtained by encapsulating any of the above liquid crystals is also applicable. The liquid crystal having memory properties does not require electric power for maintaining image display, due to the memory properties. Moreover, the liquid crystal having memory properties may be formed into an integrated device, and can be used in a state in which the device is separated from a main body. Moreover, the device can be produced at a low cost.

Examples of the display element having memory properties include, besides the above-mentioned liquid crystal display elements, an electrochromic element, an electrophoretic element, and an element that utilizes rotation by an electric field.

In a display element 40 illustrated in FIG. 1, a liquid crystal layer is used as a display layer 43.

In this exemplary embodiment, the display layer 43 of the display element 40 has a PDLC (Polymer Network Liquid Crystal) structure in which a chiral nematic liquid crystal (cholesteric liquid crystal) has been dispersed in a gelatin binder. However, the structure is not limited thereto, and the display layer 43 of the display element 40 may have a system in which a cholesteric liquid crystal is disposed within a cell with the interelectrode distance being fixed by a rib, or may include an encapsulated cholesteric liquid crystal. Moreover, the liquid crystal is not limited to the cholesteric liquid crystal, and a smectic A liquid crystal, a nematic liquid crystal, a discotic liquid crystal, and the like are also usable.

Moreover, by the use of a liquid crystal having memory properties such as a chiral nematic liquid crystal, a surface-stabilized chiral smectic C liquid crystal, a bistable twisted nematic liquid crystal, or a fine particle dispersed liquid crystal, an optical modulator of this exemplary embodiment can be utilized as an optical recording medium or an image recording medium.

As an auxiliary member which assists a liquid crystal in changing its optical characteristics, passive optical components, such as a polarizing plate, a phase difference plate, and a reflector, may be used in combination with the liquid crystal. It is also possible to add a dichroic pigment to the liquid crystal.

In general, the film thickness of the display layer 43 is preferably in the range of from 1 to 50 μm.

As a liquid crystal material, known liquid crystal compositions, such as a cyanobiphenyl liquid crystal composition, a phenylcyclohexyl liquid crystal composition, a phenyl benzoate liquid crystal composition, a cyclohexyl benzoate liquid crystal composition, an azomethine liquid crystal composition, an azobenzene liquid crystal composition, a pyrimidine liquid crystal composition, a dioxane liquid crystal composition, a cyclohexylcyclohexane liquid crystal composition, a stilbene liquid crystal composition, and a tolan liquid crystal composition, may be used. To the liquid crystal material, additives may be added, such as colorants (e.g., a dichroic colorant) and fine particles. The liquid crystal material may be dispersed in a polymer matrix, or formed into a polymer gel, or encapsulated to form microcapsules. Moreover, the liquid crystal may be any one of a high-molecular-weight, intermediate-molecular-weight, and low-molecular-weight liquid crystals, or may be a mixture thereof.

Moreover, a substrate 41 and an electrode 42 of the display element 40 may have similar constitutions to those of the substrate 31 and electrode 32 of the optical switching element 30, respectively.

In this exemplary embodiment, if the optical switching element 30 and the display element 40 are connected to each other as described above, they may be integrated to form an optically writable display medium 20. By the integration, the connection between the optical switching element 30 and the display element 40 may be stabilized.

In particular, an optically writable display medium 50 in which the display element 40 having memory properties and the optical switching element 30 are integrated can be separated from a main body (optical writing apparatus) that drives the device mentioned later. Therefore, the display medium which is separated from the main body can be distributed, for example. Moreover, a user can read in an arbitrary position at any place.

As to the method of integrating the elements, the optical switching element 30, the functional film 52, and the display element 40 may be successively provided to form an integrated device in consideration of ease of production and stabilization of a display function. Examples of the functional film 52 include an isolation layer for isolating the optical switching element 30 from the display element 40 and a functional film for removing a direct current component. In the device equipped with the functional film for removing a direct current component, voltage symmetry when the device is driven by an AC electric field may be further improved.

The functional film 52 in FIG. 1 may be a light shielding layer, for example.

When writing is performed from the display element side in FIG. 1, the reproducibility of an area displaying black may be improved and/or the photodegradation of the optical switching element may be suppressed when the light shielding layer reflects or absorbs external light but transmits only light having the same wavelength as the light used for exposure, or absorbs or reflects light within the other wavelength region than the wavelength region of the light used for exposure. When writing is performed from the optical switching element side in FIG. 1, the reproducibility of the area displaying black may be improved.

The light shielding layer may be provided between the electrode 32 and the lower charge generating layer 33 or under the substrate 31.

It should be noted that, with respect to the functional film 52 in this exemplary embodiment, "absorbs light" refers to that the intensity of the light that has transmitted through the film is 10% or lower of the intensity of incident light, and "transmits light" refers to that the intensity of the light that has transmitted through the film is 50% or more, and more preferably 80% or more, of the intensity of incident light.

The electric resistance of the light shielding layer is preferably at least $10^8$ Ω·cm (or at least about $10^8$ Ω·cm) in terms of volume resistivity in consideration of prevention of reduction in the resolution due to an electric current in the light shielding layer. Furthermore, in order to increase the change in the voltage applied to the display layer 43, the electrostatic capacitance of the light shielding layer is preferably larger. Thus, the light shielding layer preferably has a higher dielectric constant and a smallest thickness possible.

The optical density required for the light shielding layer cannot be generally determined because the optical density depends on the light absorption sensitivity of the optical switching element 30 and the intensity of read-out light. When an image is read out by read-out light, the optical density is preferably 1 or more, and particularly preferably 2 or more, in order to prevent lowering of visibility due to transmitted light from the side (the lower side in FIG. 1 when writing is performed from the display element side in FIG. 1) opposite to the side from which the image is visually observed at the time of reading out. When the optical density within a wavelength region of, particularly, 400 to 700 nm is made high, the effect in preventing lowering of visibility may be strong.

The thickness of the light shielding layer thus formed is adjusted to preferably in the range of from 0.5 to 3.0 µm, and more preferably in the range of from 0.7 to 2.0 µm.

The display element of the optically writable display medium of this exemplary embodiment may be a polarity-based display element. Hereinafter, a case in which the polarity-based display element is used as the display element is described. It should be noted that the term "polarity-based display element" as used herein refers to an element which switches the display states according to the direction of an electric field or electric current. In an example of the polarity-based display element, the display state changes depending on whether electric current flows from an electrode at the display side to the other electrode or from the other electrode to the electrode at the display side. Specific examples include an element that utilizes particle movement by an electric field, particle rotation by electric field, or electrochromism.

Since the optically writable display medium having the polarity-based display element is provided with the upper and lower charge generating layers absorbing lights of respectively substantially different wavelengths, optical writing can be performed by inputting a desired image in advance without paying attention to the timing of light irradiation or applying a reversed voltage after initialization.

(Display Apparatus)

Next, one exemplary embodiment of an image writing apparatus (display apparatus) to which the optically writable display medium of this exemplary embodiment is applied is described below.

Figure 3:
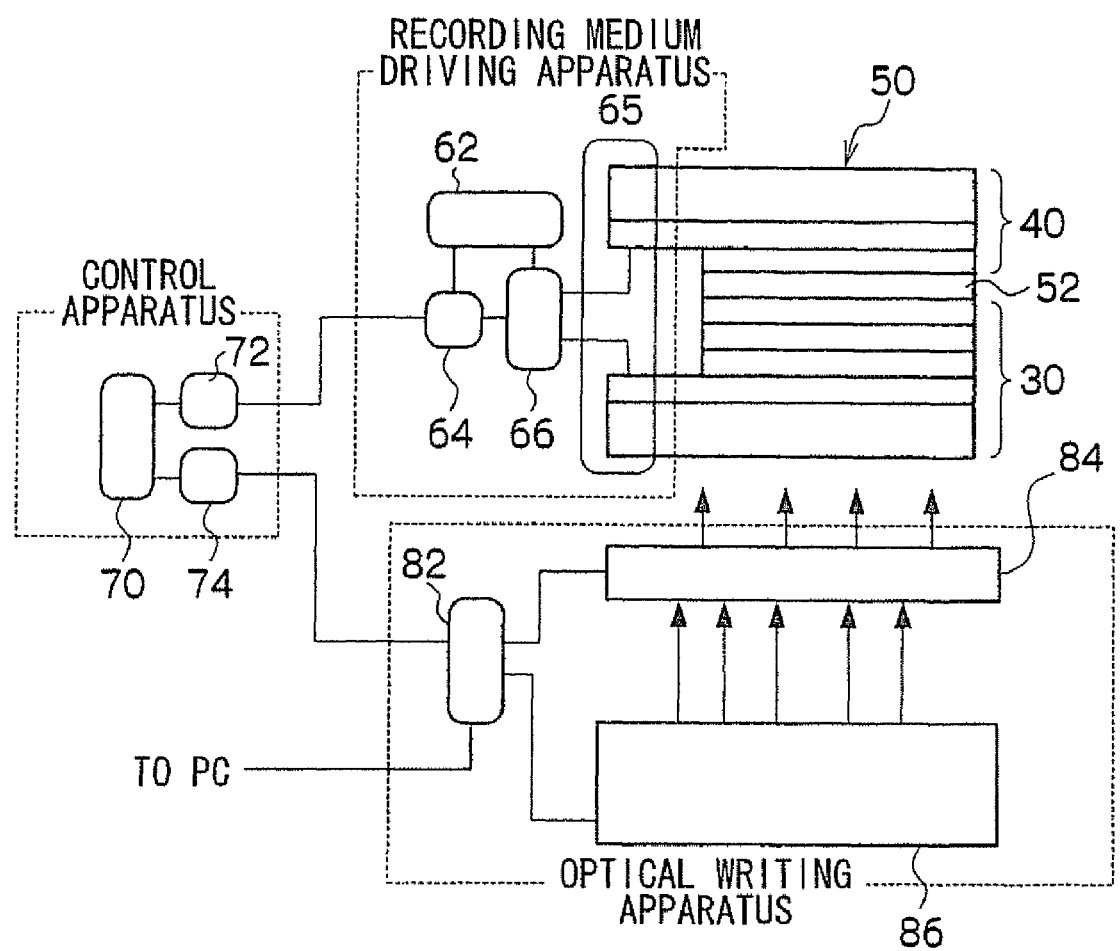
FIG. 3 is a schematic diagram illustrating an example of an image writing apparatus.

The display apparatus illustrated in FIG. 3 includes a display medium driving apparatus, a writing apparatus, and a control apparatus which controls these apparatuses. These apparatuses may be integrated into one apparatus, or may be separated from each other. In the display apparatus, the optically writable display medium of the exemplary embodiment described above is used as an optically writable display medium 50.

The display medium driving apparatus includes a waveform generator 62, an input signal detector 64, a controller 66, and a connector 65. The connector 65 connects a transparent electrode of a substrate at the optical switching element side to an electrode of a substrate at the display element side. The connector has a contact point at each side, so that the display medium driving apparatus can be freely separated from the optically writable display medium 50.

The writing apparatus includes a controller 82, a patterned light generator (e.g., a transmission-type TFT liquid crystal display) 84, and a light emitting unit (e.g., a halogen light source) 86, and the controller 82 is connected to a PC.

The control apparatus controls the display medium driving apparatus and the writing apparatus and includes a controller 70, a driving wave-generating signal output unit 72, and an optical writing data output unit 74. It should be noted that, similarly to FIG. 1, reference numerals 52 and 30 in FIG. 3 refers to a functional film and an optical switching element, respectively.

A voltage applying unit (not shown) that applies a driving pulse for display in synchronization with the optical writing by the optical writing unit has a unit that generates a pulse to be applied and a unit that detects a trigger input for outputting. An applicable pulse generating unit is, for example, a unit that includes a waveform storing unit such as ROM, a DA converter, and a controller, and that DA-converts the waveform read out from the ROM for voltage application and applies the voltage to a spatial modulation device. The pulse may be generated by using an electric circuit in place of the ROM, or in any other manner with which a pulse can be applied.

The writing apparatus includes a unit that emits light toward the spatial modulation device and a unit that patterns the light so that the light incident side of the spatial modulation device is irradiated with the patterned light. The patterning may be achieved by a transmission-type display, such as a liquid crystal display using TFT or a simple matrix-type liquid crystal display. The light emitting unit may be any unit capable of emitting light toward the spatial modulation device, such as a fluorescent light, a halogen lamp, or an electroluminescence (EL) light. It is also possible to use a light-emitting display that works as both of the patterning unit and the light emitting unit, such as an EL display, a CRT, or a field emission display (FED). Other units than those described above are also usable if the units can control the amount, wavelength, and emitting pattern of the light with which the spatial modulation device is to be irradiated.

The method for driving the display element 40 in the optically writable display medium 50 is not particularly limited, and may involve control of at least one of the AC voltage, the frequency, and the amount and the wavelength of the emitted light. The waveform of the AC voltage to be applied may be a sine waveform, a rectangular waveform, or a triangular waveform, for example. Moreover, the writing wave may be a positive pulse or negative pulse (the polarity of the electric field does not change during one voltage application period) can be used. Any combination thereof or an arbitrary waveform may be applied. In order to improve the display performance and the like, a sub-pulse that cannot perform display switching by itself may be added to the driving pulse. Application of a small bias component may be effective depending on the type of the display element, in which case the application of the small bias component may be conducted.

An image can be written on the optically writable recording medium with the optical writing apparatus having the structure as described above. The image once written in the optically writable recording medium may be retained even when the medium is detached from the connector 65, and the image may be subjected to reading, circulating, distribution, and the like. The written image can be erased and a different image can be newly written by connecting the medium again to the connector 65 and applying a voltage to the medium. Therefore, the optically writable recording medium may satisfy the demand for resource saving.

The optical writing method of this exemplary embodiment includes irradiating the optically writable display medium of this exemplary embodiment described above with a light having a wavelength that only the upper charge generating layer absorbs and another light having a wavelength that only the lower charge generating layer absorbs, to thereby perform optical writing.

The lights of the respective wavelengths may be emitted using the writing apparatus described above.

EXAMPLES

The present invention is more specifically described with reference to examples below, but is not limited thereto.

Example 1

Production of an Optically Writable Display Medium

An optically writable recording medium having a structure similar to that shown in FIG. 1 is produced as follows.

A polyethylene terephthalate (PET) substrate 31 (125 μm in thickness, 550 mm×250 mm) on which an ITO film (800 Å in thickness) as the electrode layer 32 has been formed is prepared. The lower charge generating layer 33 is formed on the ITO film.

Specifically, titanylphthalocyanine as a charge generating material and a butyral resin, S-LEC (manufactured by Sekisui Chemical Co., Ltd.), as a binder resin are first mixed in a ratio of 3:2 (weight ratio). The mixture is dissolved and dispersed in butanol to prepare a 4 weight % solution. The solution is spin-coated in such a thickness as to give an absorptance of 80% to thereby form the lower charge generating layer 33.

The charge transport layer 34 is then formed on the lower charge generating layer 33. Specifically, N,N-bis(3,4-dimethylphenyl)bisphenyl-4-amine (CTM A) with an ionization potential of 5.39 eV as a charge transport material and polycarbonate{bisphenol-Z, (poly(4,4'-cyclohexylidene diphenylene carbonate))} as a binder resin are mixed in a ratio of 3:2 (weight ratio). The mixture is dissolved in monochlorobenzene to form a 10 weight % solution (coating solution B). The solution is applied by using an applicator (Gap: 100 μm) and dried to form the charge transport layer 34 with a thickness of 7 μm on the charge generating layer 33.

Furthermore, dibromoanthanthrone as a charge generating material and a butyral resin, S-LEC (manufactured by Sekisui Chemical Co., Ltd.), as a binder resin are mixed in a ratio of 4:1 (weight ratio). The mixture is dissolved and dispersed in butanol to thereby obtain a 6 weight % solution. The solution is spin-coated in such a thickness as to give an absorptance of 80% to thereby form the upper charge generating layer 35 on the charge transport layer 34.

A 3 weight % aqueous solution of polyvinyl alcohol is applied by spin coating to the optical switching element 30 to form a polyvinyl alcohol film, which serves as an isolation layer (the functional film 52). A sample for measuring electric characteristics is prepared by applying an adhesive manufactured by Takeda Chemical Industries, Ltd. (A50/A315 are mixed using butyl acetate as a solvent) as a urethane adhesive in a thickness of 5 μm to the transparent electrode 42 provided on the transparent substrate 41, drying the adhesive, and adhering the transparent electrode 42 to the isolation layer.

For production of a medium, the adhesive mentioned above is applied to the isolation layer, and then dried. Furthermore, on the isolation layer, the display layer 43 including a capsule liquid crystal element, the light-shielding film (functional film 52), the transparent electrode 42, and the transparent substrate 41 are formed as follows.

To 74.8 parts by weight of a nematic liquid crystal E8 having a positive dielectric anisotropy (manufactured by Merck & Co., Inc.), 21 parts by weight of a chiral agent CB15 (manufactured by BHD) and 4.2 parts by weight of a chiral agent R1011 (manufactured by Merck & Co., Inc.) are dissolved by heating and then allowed to cool to room temperature, whereby a chiral nematic liquid crystal that can selectively reflect blue-green light is obtained.

To 10 parts by weight of the blue-green chiral nematic liquid crystal are added 3 parts by weight of an adduct of 3 moles of xylene diisocyanate and 1 mole of trimethylol propane (D-110N, manufactured by Takeda Chemical Industries, Ltd.) and 100 parts by weight of ethyl acetate, so that a uniform solution is formed which serves as an oil phase.

Separately, 10 parts by weight of polyvinyl alcohol (POVAL 217EE, manufactured by Kuraray Co., Ltd.) is added to 1000 parts by weight of hot ion-exchanged water, stirred, and allowed to cool to thereby prepare a liquid serving as an aqueous phase.

Next, in a household mixer energized with 30 V AC through a slidax, 10 parts by weight of the oil phase is dispersed and emulsified in 100 parts by weight of the aqueous phase for 1 minute to form an oil-in-water emulsion, in which oil phase particles are dispersed in the aqueous phase. The oil-in-water emulsion is stirred for 2 hours while heated in a 60° C. water bath to thereby complete the interfacial polymerization and form liquid crystal microcapsules. The average particle diameter of the obtained liquid crystal microcapsules is measured with a laser particle size distribution meter. The average particle diameter is estimated to be about 12 μm.

The obtained liquid crystal microcapsule dispersion is filtered through a stainless steel mesh with a mesh size of 38 μm, and then allowed to stand for a day after filtration. An opaque white supernatant is then removed from the dispersion to thereby obtain a liquid crystal microcapsule slurry with a solid content of about 40 weight %.

To the obtained slurry, a 10 weight % polyvinyl alcohol solution and water are added to thereby prepare a coating solution with a solid content of 20 weight % (coating solution C). The weight of polyvinyl alcohol in the 10 weight % polyvinyl alcohol solution is two thirds of the weight of the solid component of the slurry The coating solution C is then applied to the surface of an ITO film (a transparent electrode layer having a thickness of 800 Å) formed on a PET film (HIGHBEAM, manufactured by Toray Co., Ltd., a transparent substrate having a thickness of 125 μm) using an applicator with a gap of 300 μm to thereby form a display element layer containing a liquid crystal having a thickness of 30 μm. Black polyimide (BKR-105, manufactured by Nippon Kayaku Co., Ltd.) is then applied thereto to form the functional film 52 (Light shielding film having a thickness of 1 μm), whereby a display element laminated body is obtained.

The display element laminated body is adhered to the adhesive surface on the isolation layer (functional film) on the optical switching element layer, whereby an optically writable display medium of Example 1 is produced.

The wavelength and absorptance of each of the lower charge generating layer 33 and the upper charge generating layer 35 in the obtained optically writable display medium are as shown in FIG. 4.

Comparative Example 1

For the preparation of the upper charge generating layer, titanylphthalocyanine as a charge generating material and a butyral resin, S-LEC (manufactured by Sekisui Chemical Co., Ltd.), as a binder resin are mixed in a ratio of 3:2 (weight ratio). The mixture is dissolved and dispersed in butanol to prepare 4 weight % of solution. A sample for measuring electric characteristics of Comparative Example 1 and an optically writable display medium of Comparative Example 1 are produced in the same manner as in Example 1, except that the upper charge generating layer 35 is formed by spin-coating the solution prepared above in such a thickness as to give an absorptance of 80%.

(Evaluation 1)

Figure 7:
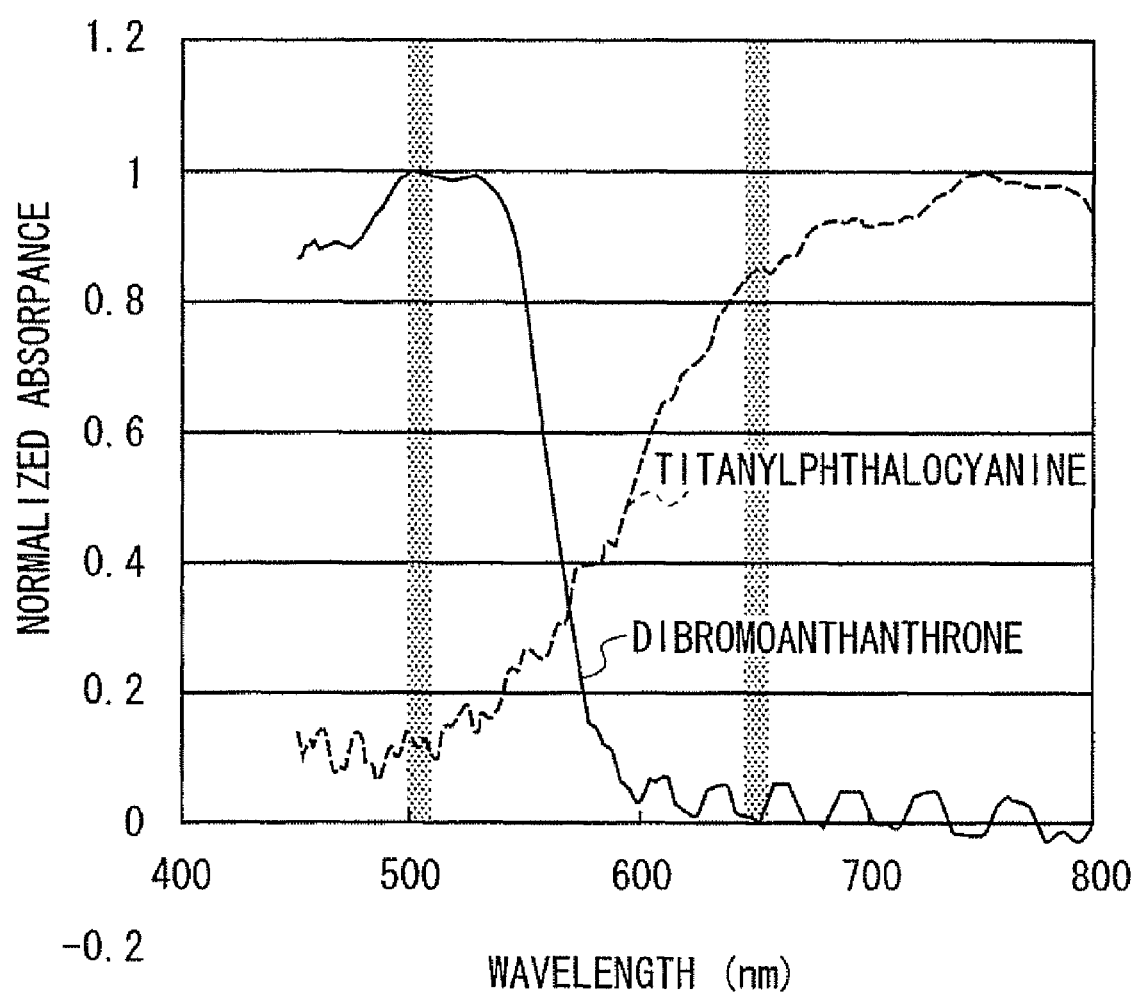
FIG. 7 is a graph illustrating the wavelength of light with which an optically writable display medium of Example 1 is irradiated in Evaluation 1.
Figure 8:
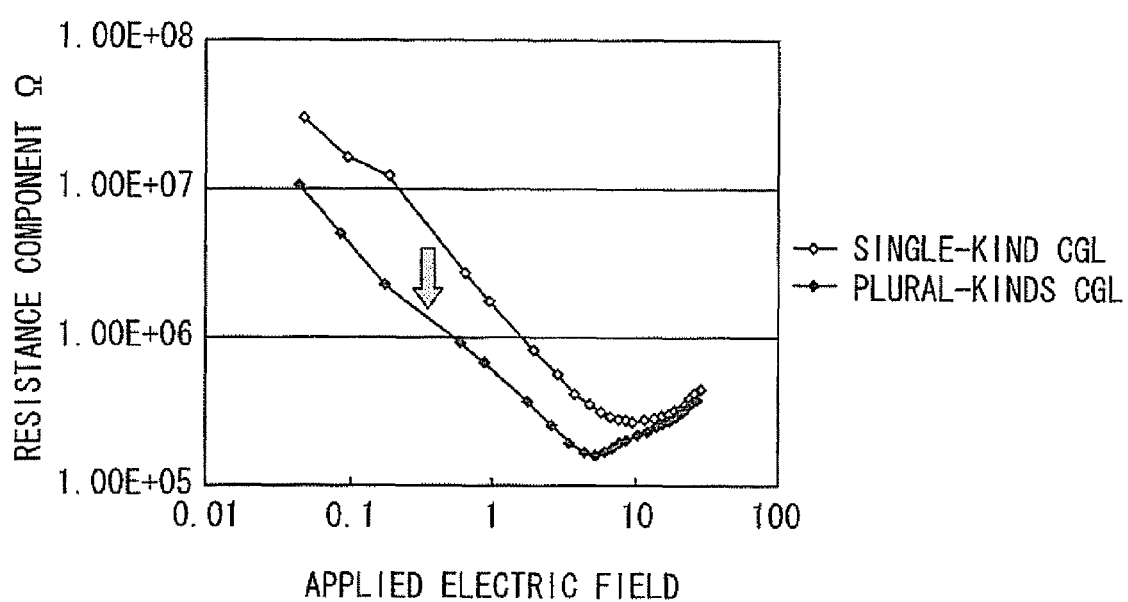
FIG. 8 is a graph illustrating evaluation results of Evaluation 1.

The optically writable display medium of Example 1 is irradiated with light having the wavelength illustrated in FIG. 7. The optically writable display medium of Comparative-Example 1 is irradiated with light having a wavelength of 640 nm. The amount of light used for each irradiation is 500 μW/cm$^2$. The resistance is measured while changing the electric field applied to the optically writable display medium of each of Example 1 and Comparative Example 1 under irradiation with light. The results are shown in FIG. 8. The measurement of the resistance at varying applied voltage is conducted by the following method: each of the samples for measuring electric characteristics is measured at 25° C. with an impedance analyzer 1260 manufactured by a Solar Thoron Company.

FIG. 8 shows that the resistance of the optically writable display medium of Example 1 is lower than that of the optically writable display medium of Comparative Example 1. This result shows that the optically writable display medium of Example 1 generates a larger amount of charge with the same amount of light, and, as a result, the optically writable display medium of Example 1 exhibits higher sensitivity. In FIG. 8, a single-kind CGL represents the optically writable display medium of Comparative Example 1, and a plural-kinds CGL represents the optically writable display medium of Example 1.

(Evaluation 2)

Figure 9:
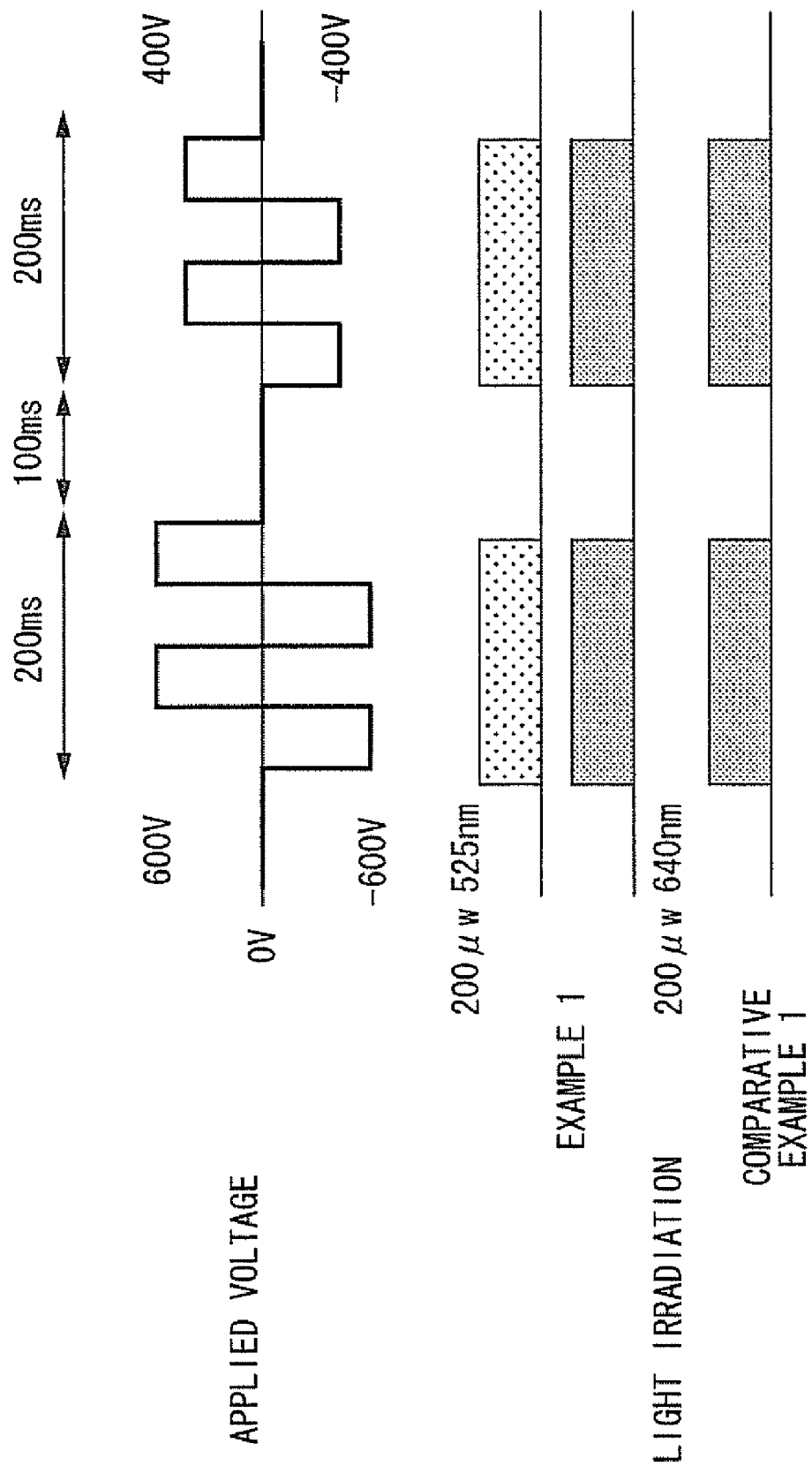
FIG. 9 is a view illustrating details of voltage application and irradiation of light in Evaluation 2.
Figure 10:
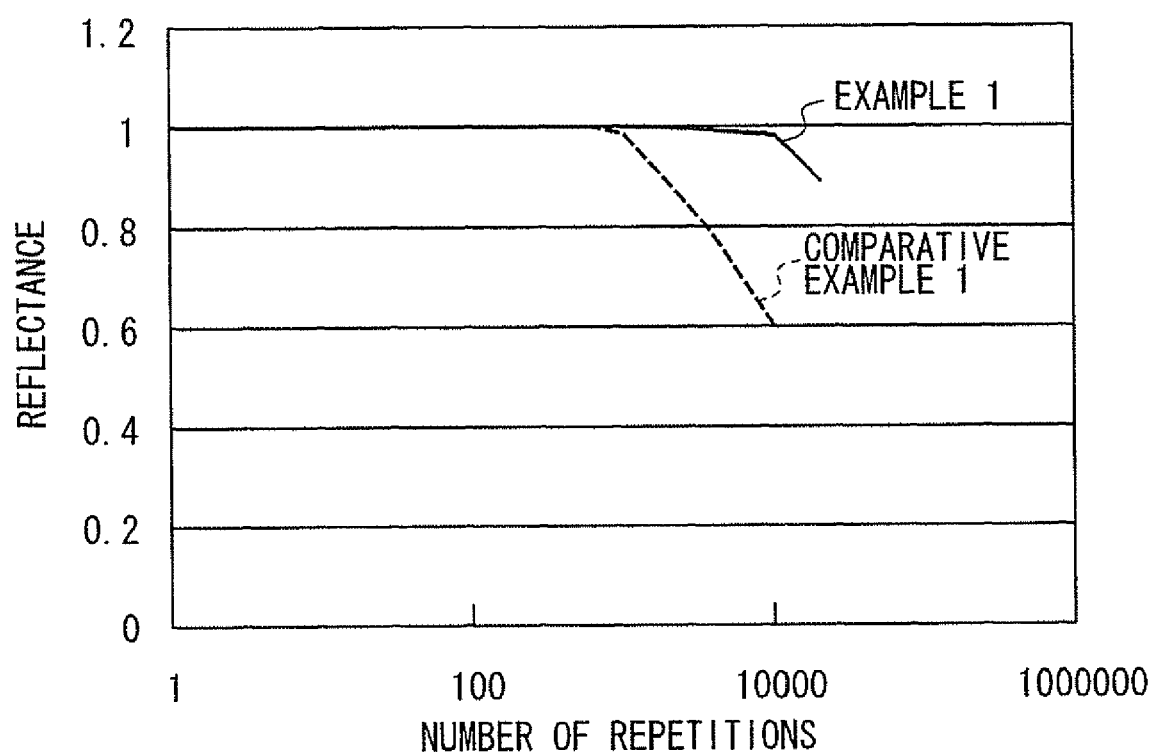
FIG. 10 is a graph illustrating evaluation results of Evaluation 2.

Each of the optically writable display medium of Example 1 and the optically writable display medium of Comparative Example 1 is irradiated with light as illustrated in FIG. 9, and writing is performed with an applied voltage of 400 V as a writing voltage at a frequency of 10 Hz with an application time of 200 ms. The sequence includes: initialization prior to the application of the writing voltage, the initialization includes applying a voltage of 600 V at a frequency of 10 Hz for an application time of 200 ms under irradiation with light; leaving the optically writable display medium in a non-irradiation state for 100 ms; and then performing the writing. The reflectance when a voltage is repeatedly applied is measured. The results are shown in FIG. 10. In FIG. 10, the reflectance at the initial voltage application is assumed to be 1 (The same applies to FIG. 12.). FIG. 10 shows that the reduction in the reflectance due to repetition is suppressed in the optically writable display medium of Example 1, compared to Comparative Example 1. The reflectance is measured with a light meter CM2200 manufactured by Minolta after the writing sequence is carried out.

(Evaluation 3)

Figure 11:
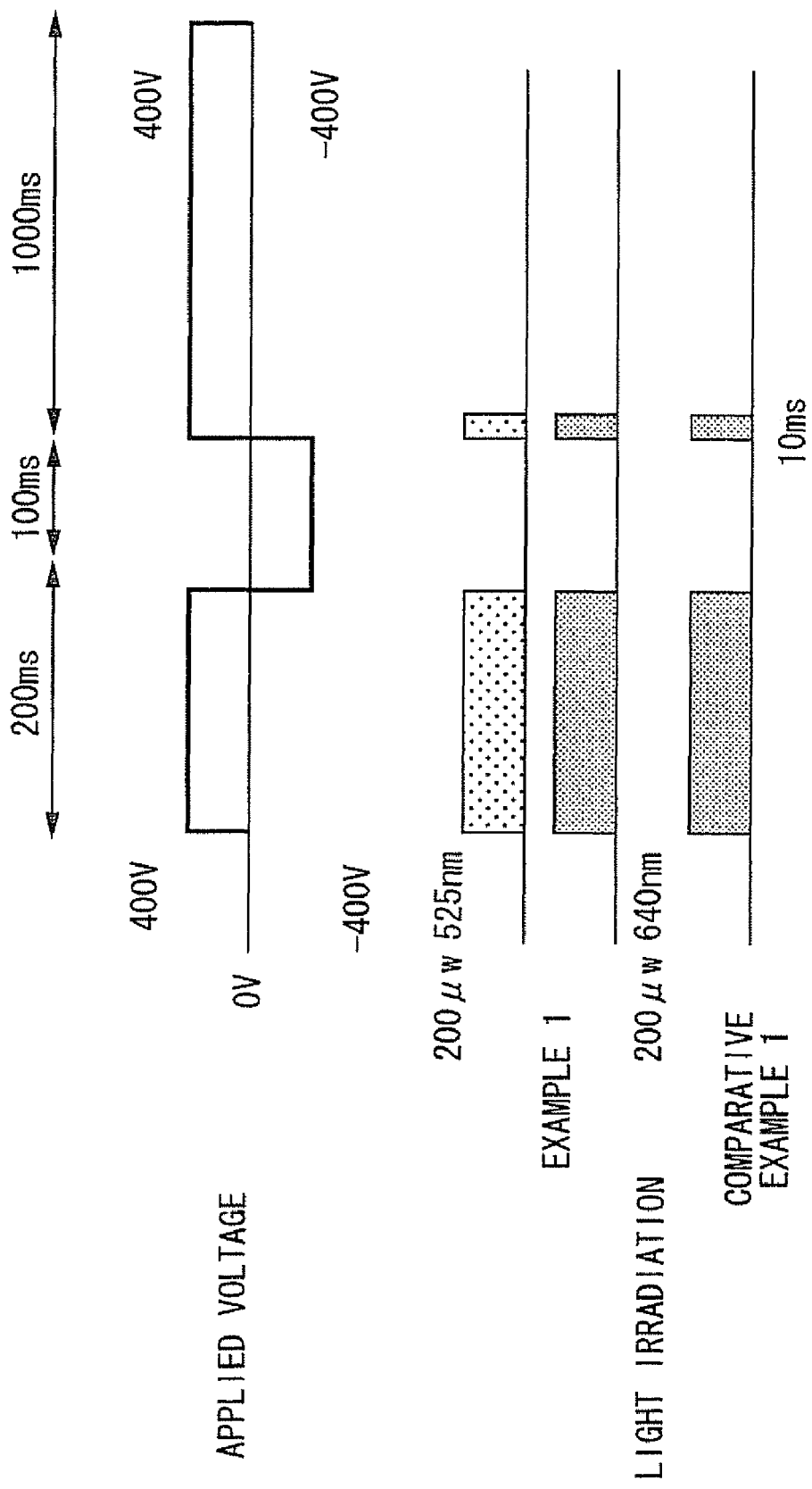
FIG. 11 is a view illustrating details of voltage application and irradiation of light in Evaluation 3.
Figure 12:
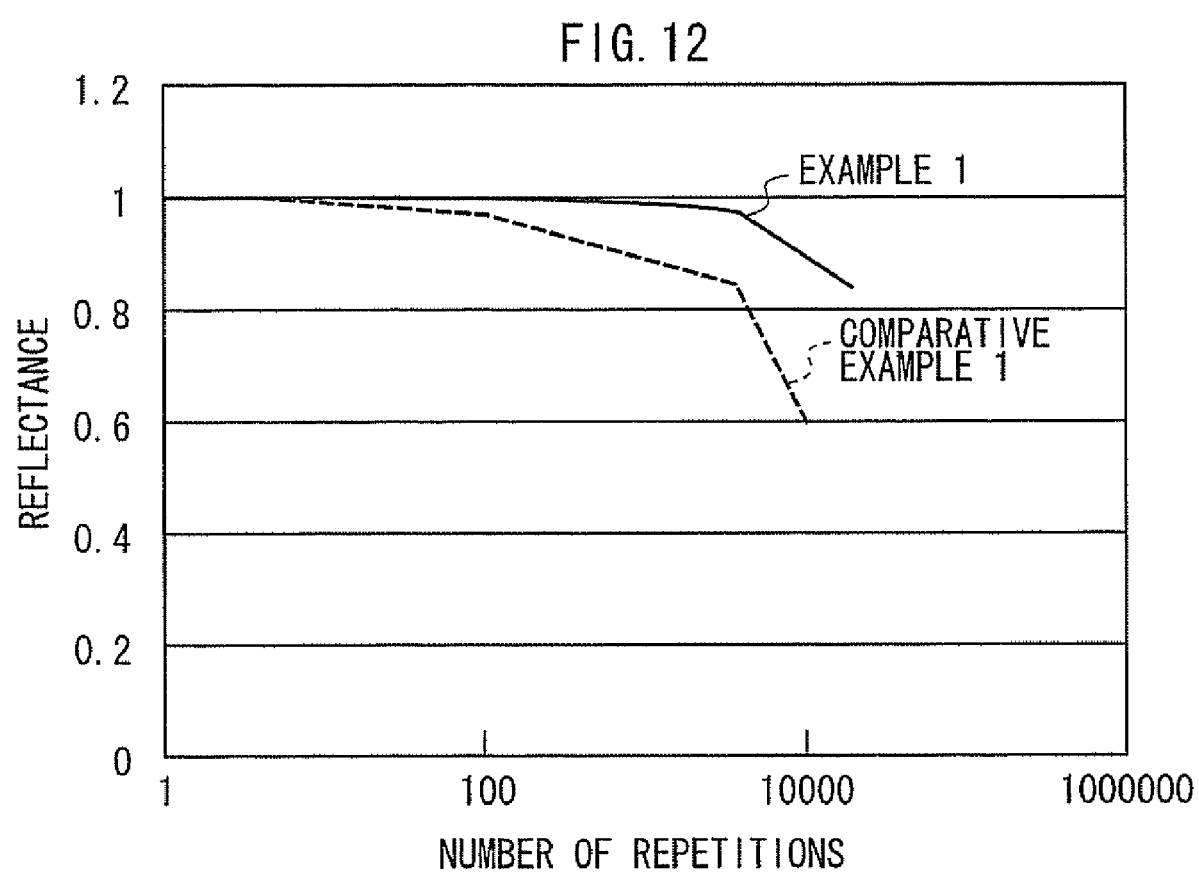
FIG. 12 is a graph illustrating evaluation results of Evaluation 3.

The writing illustrated in FIG. 11 is conducted on each of the optically writable display medium of Example 1 and the optically writable display medium of Comparative Example 1. Irradiation with a light having an intensity of 200 μw and a single wavelength of 650 nm is conducted only for 10 ms while applying a voltage of 400 V for an application time of 1000 ms as a writing voltage. The sequence includes: initialization prior to the application of the writing voltage, the initialization includes applying a voltage of 400 V for an application time of 200 ms under irradiation with light; applying a voltage of −400 V for 100 ms in a non-irradiation state; and then performing the writing. The reflectance is measured after the writing voltage is applied. The results are shown in FIG. 12. FIG. 12 shows that the reduction in the reflectance due to repetition is suppressed in the optically writable display medium of Example 1, compared to Comparative Example 1. The reflectance is measured with a light meter CM2200 manufactured by Minolta after the writing sequence is carried out.

Example 2

Specifically, chlorogallium phthalocyanine as a charge generating material and a butyral resin, S-LEC (Sekisui Chemical Co., Ltd.), as a binder resin are mixed in a mixing ratio of 3:2 (weight ratio). The mixture is dissolved and dispersed in butanol to prepare 4 weight % solution. The solution is spin-coated in such a thickness as to give an absorptance of 80%, to thereby form the lower charge generating layer 33.

The charge transport layer 34 is then formed on the lower charge generating layer 33. Specifically, N,N-bis(3,4-dimethylphenyl)bisphenyl-4-amine (CTM A) with an ionization potential of 5.39 eV as a charge transport material and polycarbonate{bisphenol-Z, (poly(4,4'-cyclohexylidene diphenylene carbonate))} as a binder resin are mixed in a mixing ratio of 3:2 (weight ratio). The mixture is dissolved in monochlorobenzene to form a 10 weight % solution (coating solution B). The solution is applied using an applicator (Gap: 100 μm) and dried to form the charge transport layer 34 with a thickness of 7 μm on the charge generating layer 33.

Furthermore, dibromoanthanthrone as the charge generating material and a butyral resin, S-LEC (manufactured by Sekisui Chemical Co., Ltd.), as a binder resin are mixed in a ratio of 4:1 (weight ratio). The mixture is dissolved and dispersed in butanol to thereby obtain a 6 weight % solution. The solution is spin-coated in such a thickness as to give an absorptance of 80% to thereby form the upper charge generating layer 35 on the charge transport layer 34.

A 3 weight % aqueous solution of polyvinyl alcohol is applied by spin coating to the optical switching element layer to form a polyvinyl alcohol film, which serves as an isolation layer (the functional film 52). A sample for measuring electric characteristics is obtained by applying an adhesive manufactured by Mitsui Chemicals Inc. (A50/A315 are mixed using butyl acetate as a solvent) as a urethane adhesive to the transparent electrode 42 provided on the transparent substrate 41, drying the adhesive whereby the film thickness becomes 5 μm, and adhering the transparent electrode 42 to the isolation layer. For production of a medium, the adhesive mentioned above is applied to the isolation layer, and then dried to produce an optical switching element laminated body.

A display element laminated body is produced in the same manner as in Example 1, except for using a particle moving element in place of the liquid crystal element. Further, the optical switching element laminated body is adhered to the display element laminated body so as to produce an optically writable display medium of Example 2. The particle moving element displays white color when −200 V is applied and displays a black color when 200 V is applied.

Comparative Example 2

For the preparation of the upper charge generating layer 35, chlorogallium phthalocyanine as a charge generating material and a butyral resin, S-LEC (Sekisui Chemical Co., Ltd.), as a binder resin are mixed in a mixing ratio of 3:2 (weight ratio). The mixture is dissolved and dispersed in butanol to prepare 4 weight % solution. An optically writable display medium is produced in the same manner as in Example 2, except that the upper charge generating layer 35 is formed by spin-coating the solution prepared above in such a thickness as to give an absorptance of 80%.

Figure 13:
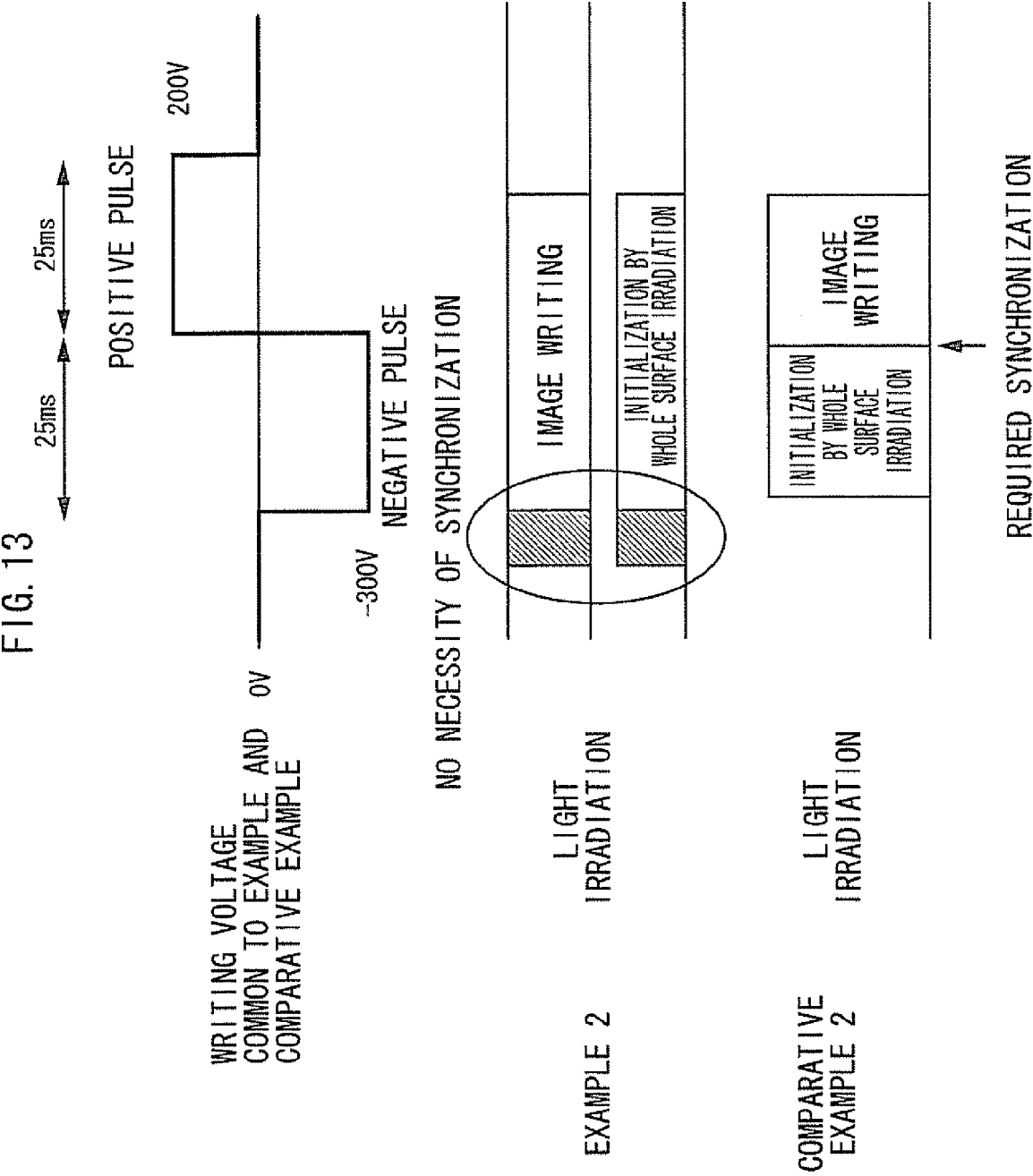
FIG. 13 is a view illustrating the conditions of image formation on an optically writable display medium of each of Example 2 and Comparative Example 2.
Figure 14:
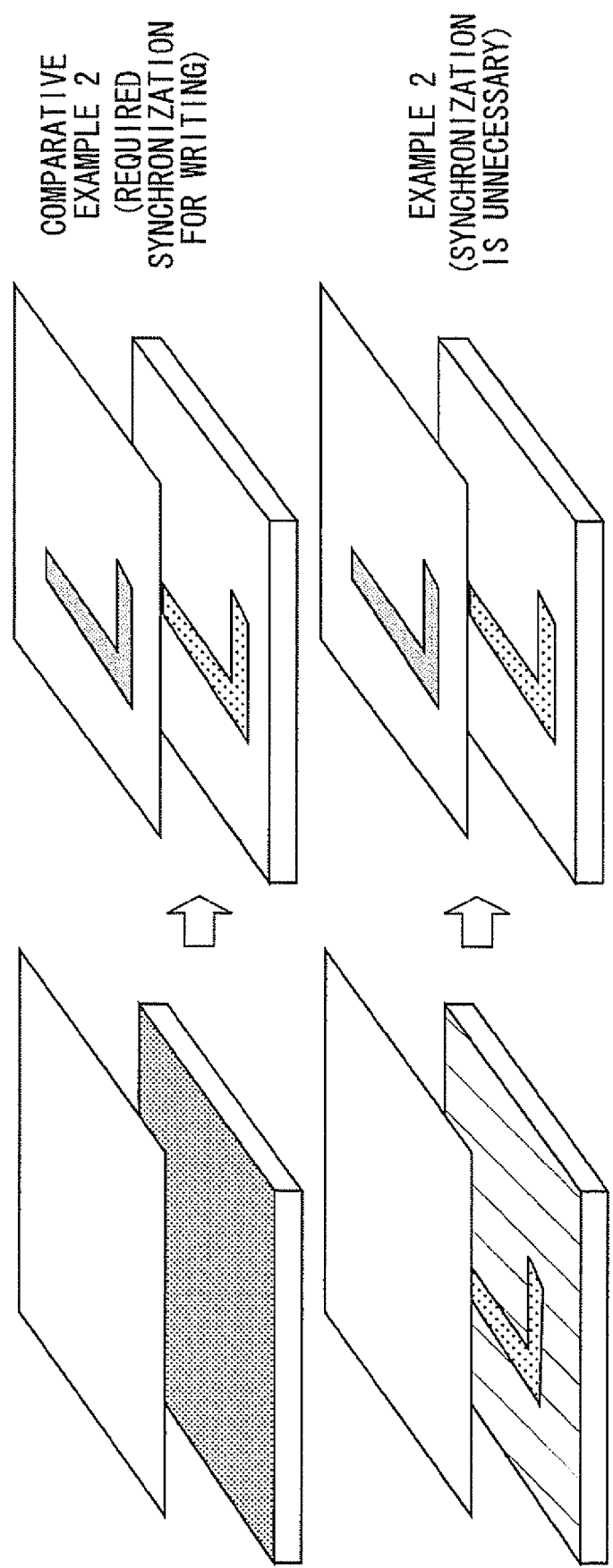
FIG. 14 is a view illustrating the outline of the image formation on the optically writable display medium of each of Example 2 and Comparative Example 2.

As the optical writing apparatus, a light emitting panel that shows an arbitrary image with light of 525 nm and/or light of 640 nm is prepared for the medium of Example 2. Specifically, a liquid crystal panel and LED sources having wavelengths of 640 nm and 525 nm respectively, are combined. For the medium of Comparative Example 2, a light emitting panel capable of forming an arbitrary image with light of 640 nm is prepared. The image ("L" shape) formation on the optically writable display medium obtained in each of Example 2 and Comparative Example 2 is described below with reference to FIGS. 13 and 14. In FIG. 14, the lower plates are light emitting panels and the upper sheets are optically writable display media in Example 2 and Comparative Example 2.

The image formation on the optically writable display medium of Comparative Example 2 uses only light having a wavelength of 640 nm. Therefore, a negative pulse is first applied as shown in FIG. 13 and the whole of a surface is irradiated with the light having a wavelength of 640 nm emitted by the light emitting panel for initialization. Thereafter, the pulse is electrically switched to a next positive pulse, and the timing when emission of light in the "L" shape having a wavelength of 640 nm by the light emitting panel is started needs to be simultaneous with the timing when the pulse is switched to the positive pulse (i.e., synchronization is required wherein the synchronization means that the light irradiation for each respective purpose is conducted only within the respective periods when the pulse voltage for the purpose is applied). After the positive pulse is applied, an image in the "L" shape is formed in the optically writable display medium as shown in FIG. 14.

In contrast, the image formation on the optically writable display medium of Example 2 is performed by irradiating the whole of a surface with light of 640 nm from the light emitting panel and irradiating the surface also with light of 525 nm in the "L" shape. The irradiation of the lights at 640 nm and 525 nm may be started before the application of the pulse (application of the negative pulse illustrated in FIG. 13) or simultaneously with the application the pulse. More specifically, synchronization, which is required in Comparative Example 2, is not required in Example 2. After the negative pulse and the positive pulse are applied, an "L"-shaped image is formed in the optically writable display medium as shown in FIG. 14.

What is claimed is:

1. A display apparatus comprising:
an optically writable display medium;
a display medium driving apparatus;
a writing apparatus; and
a control apparatus,
the optically writable display medium including,
an optical switching element that includes a charge transport layer sandwiched between an upper charge generating layer and a lower charge generating layer; and
a display element that includes a display layer having memory properties and that is provided on the optical switching element,
an absorption wavelength region of the upper charge generating layer and an absorption wavelength region of the lower charge generating layer being mutually exclusive from each other, and
the display medium driving apparatus having a voltage applying unit that applies a driving pulse for display in synchronization with optical writing by the writing apparatus.

2. The optically writable display medium according to claim 1, wherein a charge generating material contained in the upper charge generating layer is an n-type charge generating material.

3. The optically writable display medium according to claim 2, wherein a charge generating material contained in the lower charge generating layer is a p-type charge generating material.

4. The optically writable display medium according to claim 1, wherein at least one of the upper and lower charge generating layers further comprises a charge transport material.

5. The optically writable display medium according to claim 1, wherein the display element is a liquid crystal element.

6. The optically writable display medium according to claim 1, wherein the display element is a polarity-based display element.

7. The optically writable display medium according to claim 1, wherein a functional layer for removing a direct current component is provided between the optical switching element and the display element.

8. The optically writable display medium according to claim 1, wherein a light shielding layer is provided between the optical switching element and the display element.

9. The optically writable display medium according to claim 8, wherein the light shielding layer has a volume resistivity of at least about $10^8$ Ω·cm.

10. An optical writing method for irradiating using the display apparatus of claim 1, the method comprising:
irradiating, using the writing apparatus, the optically writable display medium of the display apparatus with a first light having a wavelength that only the upper charge generating layer absorbs and a second light having a wavelength that only the lower charge generating layer absorbs; and
applying, using the voltage applying unit, a driving pulse for display to the optically writable display medium of the display apparatus in synchronization with optical writing by the writing apparatus.

11. The optical writing method according to claim 10, wherein one of the first and second lights is used for initialization by whole-surface irradiation, and the other one of the first and second lights is used for image formation by imagewise irradiation.

* * * * *